(12) United States Patent
Enright et al.

(10) Patent No.: US 7,276,565 B2
(45) Date of Patent: *Oct. 2, 2007

(54) CONTINUOUS MINIEMULSION POLYMERIZATION PROCESS

(75) Inventors: Thomas E. Enright, Tottenham (CA); Paul D. Szabo, Islington (CA); Barkev Keoshkerian, Thornhill (CA)

(73) Assignee: Xerox Corporation, Stamford, CT (US)

( * ) Notice: Subject to any disclaimer, the term of this patent is extended or adjusted under 35 U.S.C. 154(b) by 444 days.

This patent is subject to a terminal disclaimer.

(21) Appl. No.: 10/600,110

(22) Filed: Jun. 20, 2003

(65) Prior Publication Data

US 2004/0260026 A1 Dec. 23, 2004

(51) Int. Cl.
*C08F 2/00* (2006.01)
*C08F 2/44* (2006.01)

(52) U.S. Cl. .................. 526/75; 526/73; 526/82; 526/86; 526/87; 526/88

(58) Field of Classification Search ............. 524/502, 524/504, 552, 567, 575; 526/227, 229, 82, 526/65, 263, 345, 346, 303.1, 342, 75, 73, 526/86, 87, 88
See application file for complete search history.

(56) References Cited

U.S. PATENT DOCUMENTS

| | | | |
|---|---|---|---|
| 5,686,518 A | 11/1997 | Fontenot et al. | ............ 524/458 |
| 5,852,140 A * | 12/1998 | Georges et al. | ............... 526/82 |
| 6,469,094 B1 * | 10/2002 | Keoshkerian et al. | ....... 524/502 |
| 6,767,974 B1 * | 7/2004 | Keoshkerian et al. | ......... 526/75 |
| 6,774,176 B1 * | 8/2004 | Nzudie et al. | ............... 524/544 |

OTHER PUBLICATIONS

Yvon Durant, "Miniemulsion Polymerization: Applications and Continuous Process," *Polym. Mat. Sci. and Eng.*, vol. 80, p. 538 (1999).
Fred Billmeyer, Jr., *Textbook of Polymer Science*, pp. 134-135 (Third Edition 1984).
Jose M. Asua, "Miniemulsion polymerization," *Progress in Polymer Science* 27 (2002), pp. 1283-1346.
Ignac Capek et al., "Radical Polymerization in Direct Mini-Emulsion Systems," *Advances in Polymer Science* (2001), vol. 155, pp. 101-165.
Barkev Keoshkerian et al., "Process Forming Particles With Functional Groups," U.S. Appl. No. 10/357,540, filed Feb. 3, 2003.

* cited by examiner

*Primary Examiner*—Robert D. Harlan
(74) *Attorney, Agent, or Firm*—Zosan Soong (57) ABSTRACT

A process including:
heating to a first polymerization temperature a first mixture including a free radical polymerizable monomer, a free radical initiator, and a stable free radical compound to polymerize only a portion of the monomer, resulting in a prepolymer composition;
shearing a second mixture including the prepolymer composition, a continuous phase liquid, and a stabilizing compound to create a miniemulsion; and
flowing the miniemulsion within a polymerization reactor and heating the miniemulsion at a second polymerization temperature to form polymeric particles wherein the formation of the polymeric particles occurs while the miniemulsion flows within the reactor.

19 Claims, 2 Drawing Sheets

CONTINUOUS MINIEMULSION POLYMERIZATION PROCESS

BACKGROUND OF THE INVENTION

Keoshkerian et al., U.S. Pat. No. 6,469,094 describes a process for the preparation of polymeric particulate materials employing a free radical polymerizable monomer, a free radical initiator and a stable free radical compound wherein the process includes a first bulk polymerization where controlled initiation and limited or partial monomer polymerization is accomplished for the purpose of preparing a prepolymer mixture followed by a second stage miniemulsion polymerization where substantially complete monomer polymerization is accomplished. To lower the cost of production, there is a need, which the present invention addresses, for new free radical polymerization processes that produce polymeric particles in a continuous mode.

Exemplary polymerization processes are described in the following:

Fontenot et al., U.S. Pat. No. 5,686,518.

Georges et al., U.S. Pat. No. 5,852,140.

Yvon Durant, "Miniemulsion Polymerization: Applications and Continuous Process," *Polym. Mat. Sci. and Eng.*, Vol. 80, p. 538 (1999).

Fred Billmeyer, Jr., *Textbook of Polymer Science*, pp. 134-135 (Third Edition 1984).

Jose M. Asua, "Miniemulsion polymerization," *Progress in Polymer Science* 27 (2002), pp. 1283-1346.

Ignac Capek et al., "Radical Polymerization in Direct Mini-Emulsion Systems," *Advances in Polymer Science* (2001), Vol. 155, pp. 101-165.

Barkev Keoshkerian et al., "Process Forming Particles With Functional Groups," U.S. Ser. No. 10/357,540, filed Feb. 3, 2003.

BRIEF SUMMARY

The present invention is accomplished in embodiments by providing a process comprising:

heating to a first polymerization temperature a first mixture comprising a free radical polymerizable monomer, a free radical initiator, and a stable free radical compound to polymerize only a portion of the monomer, resulting in a prepolymer composition;

shearing a second mixture including the prepolymer composition, a continuous phase liquid, and a stabilizing compound to create a miniemulsion; and flowing the miniemulsion within a polymerization reactor and heating the miniemulsion at a second polymerization temperature to form polymeric particles wherein the formation of the polymeric particles occurs while the miniemulsion flows within the reactor.

There is also provided in embodiments a process comprising:

heating to a first polymerization temperature a first mixture comprising a first free radical polymerizable monomer, a first free radical initiator, and a first stable free radical compound to polymerize only a portion of the first monomer, resulting in a prepolymer composition;

shearing a second mixture including the prepolymer composition, a continuous phase liquid, and a stabilizing compound to create a miniemulsion; and flowing the miniemulsion within a polymerization reactor and heating the miniemulsion at a second polymerization temperature to form polymeric particles wherein the formation of the polymeric particles occurs while the miniemulsion flows within the reactor, wherein there is added to the second mixture, the miniemulsion, or both the second mixture and the miniemulsion at any time prior to the formation of the polymeric particles a second free radical initiator, a second free radical polymerizable monomer, and an optional second stable free radical compound, wherein at least one of the second initiator and the second monomer includes a functional group, wherein the polymeric particles each includes a compound with the functional group covalently bound and with the functional group disposed on the particle surface.

BRIEF DESCRIPTION OF THE DRAWING

Other aspects of the present invention will become apparent as the following description proceeds and upon reference to the following figures which represent exemplary embodiments.

Unless otherwise noted, the same reference numeral in different Figures refers to the same or similar feature.

DETAILED DESCRIPTION

In embodiments, the term "miniemulsion" refers to for example an aqueous dispersion of relatively stable hydrophobic droplets of less than about 1.5 micrometer in diameter, particularly less than about 1 micrometer in diameter.

The terms "polymer" and "polymeric" encompass a compound with any number of repeating units, whether a short chain (that is, an oligomer) or a longer chain.

The phrase "functional group" refers to: (1) a "functional charged group" which presently contains a positive or negative charge; and (2) a "functional neutral group" which presently is neutral but can be induced by ionization to result in a positive or negative charge. Ionization can be induced by for example heating, electrical potential, changing pH, and the like. For example, a carboxylic acid as the functional neutral group can be taken to a basic pH to generate the carboxylate functional charged group. The functional neutral group can be, but is not limited to, for example carboxylic acids, sulphonic acids, phosphates, amines and the like. The functional charged group can be for example carboxylates, sulfonates, phosphates, quaternary amines, and the like. The substituents on the functional group can be aromatic, aliphatic or combinations thereof.

The density or amount of functional groups on the polymeric particle surface may be of any appropriate values and may be determined by any suitable technique and device such as by using a zeta potentiometer.

The present invention may be used to prepare a variety of polymeric materials in a cost efficient manner such as for example ion exchange resins, coatings, paints, controlled release materials (e.g., drug delivery), and toner particles for use in liquid and dry developer marking applications. An advantage of the present invention is that the processes thereof in embodiments may afford control over the particle size, particle size distribution properties of the resulting fine particulate products, and precise control over the molecular weight and molecular weight distribution properties of the resulting polymer products. Additionally, the present invention provides in embodiments superior latex formation processes with substantially quantitative conversion, or yield, of polymer product and with unexpectedly low residual monomer. In embodiments, the functional group allows for the stability of the particles and also manipulation of the particle size by reducing the charge (by example through pH) and allowing for aggregation.

In an embodiment, the present invention relates to a stable free radical moderated miniemulsion polymerization process for producing a polymer resin or resins, that have narrow polydispersities, that is, narrow molecular weight distributions as defined by the ratio Mw:Mn, where Mw is weight average molecular weight of the polymer and Mn is number average molecular weight of the polymer, with an easily controlled modality.

The present invention involves heating the first mixture composed of at least one free radical polymerizable monomer, a first free radical initiator, and a stable free radical compound to polymerize only a portion of the monomer, resulting in a prepolymer composition.

The heating of the first mixture can be at a polymerization temperature ranging for example from about 100 to about 145 degrees C for a time ranging for example from about 5 minutes to about 4 hours, particularly from about 20 minutes to about 1 hour. The heating conditions can vary depending on, for example, the scale of the reaction and the results desired.

The prepolymer composition includes unreacted monomer and molecules of polymer. In embodiments, no unreacted free radical initiator may be present but the prepolymer composition may include small amounts of the stable free radical compound. Heating of the first mixture polymerizes less than all of the monomer or monomers; in embodiments, heating of the first mixture is ended when only a portion of the monomer or monomers is polymerized such as for example from about 1 to about 50% by weight, particularly from about 10 to about 25% by weight, of the monomer or monomers. There may be any suitable percentage of conversion of the monomer(s) to the polymer as long as the viscosity of the prepolymer composition is not too high for shearing. In embodiments, the monomer or monomers have polymerized into an oligomer in the prepolymer composition with the number of repeating units ranging for example from about 2 to about 50.

The amounts of the various components of the first mixture (prior to heating) are now described with illustrative concentrations.

The molar ratio of the stable free radical compound (SFR) to radicals from the first free radical initiator (INIT1) is for example from about 0.8(SFR):1.2(INIT1) to about 1(SFR):1(INIT1). Since one mole of the free radical initiator (whether first free radical initiator or second free radical initiator), depending on the specific initiator, can theoretically result in one, two, three or more moles of radicals, the molar ratio of the free radical initiator (whether first free radical initiator or second free radical initiator) is based on the theoretical maximum number of moles of radicals resulting from the free radical initiator.

In embodiments, in the first mixture, the molar ratio of free radical polymerizable monomer (total of all types) to stable free radical compound (total of all types) to radicals from the free radical initiator (total of all types) is for instance from about 50:2:1 to about 10,000:2.5:1 and particularly in the range of about 300:1.3:1 to about 7,000:1.8:1.

In the first mixture, each ingredient (e.g., monomer, initiator, and stable free radical compound) may be of only one type or may be composed of two or more types. Where the ingredient is composed of two or more types, each ingredient type may be present at any suitable molar ratio such as at a molar ratio ranging for example from about 99 (first type of one ingredient):1 (second type of the same ingredient) to about 1 (first type of one ingredient):99 (second type of the same ingredient).

A continuous phase liquid may be present or absent in the first mixture prior to heating. The phrase "continuous phase liquid" refers to any liquid that allows a different phase composed of droplets or particles to be present within the liquid. In embodiments, any continuous phase liquid present in the first mixture may be boiled off at the temperature employed in the heating. The continuous phase liquid may be for example water, an organic liquid such as toluene, acetone, and tetrahydrofuran, and the like.

In embodiments, the ingredients of the first mixture and the heating conditions for the first mixture are selected in order to perform a bulk polymerization or solution polymerization of the first monomer to low conversion, where the conversion rate is described herein.

A second mixture is subjected to shearing to create a miniemulsion, wherein the second mixture is composed of at least the prepolymer composition, a continuous phase liquid, and a stabilizing compound.

In embodiments of the present invention, there is added to the second mixture, the miniemulsion, or both the second mixture and the miniemulsion at any time prior to the formation of the polymeric particles a number of additional ingredients (referred as "Additional Ingredients") such as for instance a second free radical initiator, a second free radical polymerizable monomer, and an optional second stable free radical compound, wherein at least one of the second initiator and the second monomer includes a functional group, wherein the polymeric particles each includes a compound with the functional group covalently bound and with the functional group disposed on the particle surface. In embodiments, all of the Additional Ingredients can be added to the second mixture prior to the shearing. In other embodiments, all of the Additional Ingredients are added to the miniemulsion. In still other embodiments, one or more of the Additional Ingredients is added to the second mixture, while the rest of the Additional Ingredients is added to the miniemulsion. In further embodiments, a portion of a single Additional Ingredient may be added to the second mixture while the remaining amount of that single Additional Ingredient is added to the miniemulsion. All manners of adding the Additional Ingredients are encompassed within the present invention.

In other embodiments of the present invention, one or more of such Additional Ingredients are not added and no covalently bound functional group is disposed on the surface of the polymeric particles.

The shearing can be accomplished by a variety of high shear mixers, for example, a piston homogenization, a microfluidizer, a polytron, an ultrasonicator, and the like devices. In embodiments, the miniemulsion may be formed for instance in a piston homogenizer at for example from about 1 to about 60 minutes at a pressure for instance of about 1,000 to about 30,000 psi. The miniemulsion prior to its heating is composed of droplets of the prepolymer composition with a volume average diameter, for example, of from about 25 nanometers to about 1 micrometer, particularly from about 100 to about 400 nanometers.

Illustrative molar percentages of the ingredients in the second mixture/miniemulsion are as follows:

(1) The second free radical polymerizable monomer is present in an amount for example from about 1% to about 25% molar relative to the first monomer (based on 100 moles of the first monomer), and particularly from about 5% to about 10% molar relative to the first monomer.

(2) The second free radical initiator may be present in an amount for example from about 0.1% to about 0.01% molar relative to the second monomer (based on 100 moles of the second monomer).

(3) The optional second stable free radical compound may be present for example at a molar ratio to radicals from the second initiator of from about 0.8 to about 1.2.

(4) The stabilizing compound may be present for example in the range of about 0.2% to about 5% (weight/weight to the continuous phase liquid).

(5) The continuous phase liquid may be present for example in the range of about 50% to about 90% by weight relative to all the hydrophobic ingredients in the second mixture (e.g., polymerized monomers, unreacted monomers and any waxes).

In the second mixture/miniemulsion, each ingredient (e.g., prepolymer composition, continuous phase liquid, stabilizing compound, monomer, stable free radical compound, and initiator) may be of only one type or may be composed of two or more types. Where the ingredient is composed of two or more types, each ingredient type may be present at any suitable molar ratio such as at a molar ratio ranging for example from about 99(first type of one ingredient):1(second type of the same ingredient) to about 1(first type of one ingredient):99(second type of the same ingredient).

In other embodiments, illustrative molar percentages of the ingredients in the second mixture/miniemulsion are as follows:

(1) The free radical initiator may be present in an amount for example from about 0.1% to about 0.01% molar relative to the monomer (based on 100 moles of the monomer).

(2) The stable free radical compound may be present for example at a molar ratio to radicals from the initiator of from about 0.8 to about 1.2.

(3) The stabilizing compound may be present for example in the range of about 0.2% to about 5% (weight/weight to the continuous phase liquid).

(4) The continuous phase liquid may be present for example in the range of about 50% to about 90% by weight relative to all the hydrophobic ingredients in the second mixture (e.g., polymerized monomers, unreacted monomers and any waxes).

In embodiments, the heating of the first mixture and the shearing of the second mixture are accomplished in a batch mode to provide a batch amount of the miniemulsion to the polymerization reactor.

In other embodiments, the heating of the first mixture and the shearing of the second mixture are accomplished in a continuous mode to provide a continuous amount of the miniemulsion to the polymerization reactor.

The present process then involves flowing the miniemulsion within a polymerization reactor and heating the miniemulsion at a second polymerization temperature to form polymeric particles wherein the formation of the polymeric particles occurs while the miniemulsion flows within the reactor. Forming the polymeric particles while the miniemulsion flows within the reactor accomplishes a continuous mode of operation.

The terms "continuous" (as used in "continuous mode" and "continuous amount") and "batch" (as used in "batch mode" and "batch amount") are used in their ordinary sense in the chemical arts to differentiate the two basic types of manufacturing processes.

The heating of the miniemulsion can be at a polymerization temperature ranging for example from about 100 to about 145 degrees C for a time ranging for example from about 1 hour to about 9 hours, particularly from about 2 hours to about 4 hours. The heating conditions can vary depending on, for example, the scale of the reaction and the results desired.

In embodiments, the miniemulsion is subjected to a pressure ranging for example from about 100 to about 1000 kPa, or from about 500 to about 700 kPa, while the miniemulsion flows within the reactor.

In embodiments, the miniemulsion flows within the reactor at a volumetric flowrate of for example about 1 to about 10 ml/minute, or from about 2 to about 5 ml/minute. Volumetric flowrates outside these values are encompassed within the present invention since the volumetric flowrate may vary among different apparatus, and depends upon the geometry of the reactor (i.e., the tubing length and diameter in the case of a tubular-flow reactor). The volumetric flowrate is calculated based on following formula: volumetric flowrate=reactor volume/average residence time, where the reactor volume=tubing length×cross-sectional area.

Any suitable continuous mode polymerization reactor can be used such as for example a tubular-flow reactor.

The present process, in embodiments, provide for high monomer to polymer conversion levels, or degrees of polymerization, for example, of about 90 percent by weight or greater, or from about 95 to 100 percent, and particularly from about 98 to about 100 percent (the conversion percentages refer to all monomers employed in the present process). After heating of the miniemulsion to the second polymerization temperature to form the polymeric particles, the resulting composition containing the polymeric particles is considered a latex or emulsion.

DETAILED DESCRIPTION OF DRAWINGS

Figure 1:
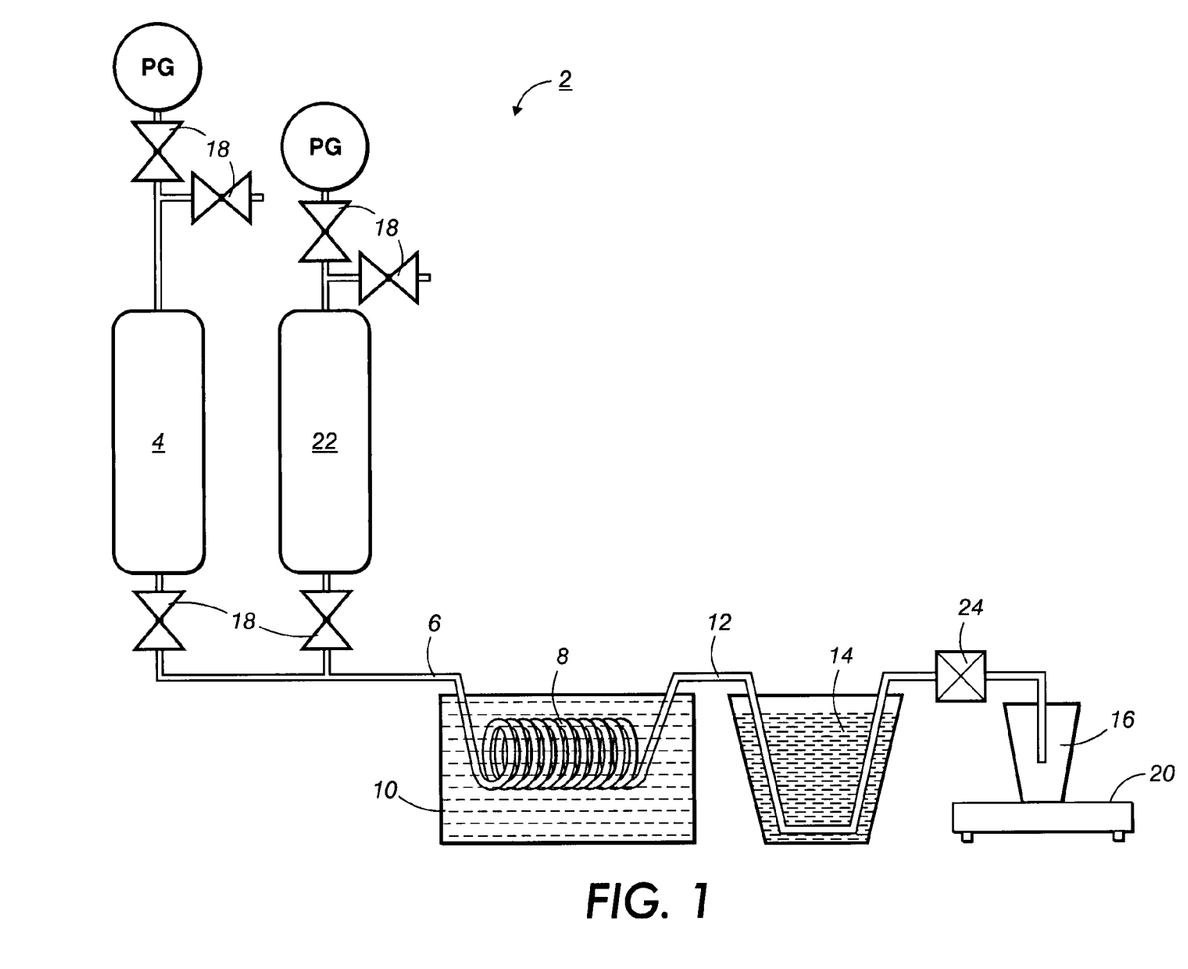
FIG. 1 represents a schematic depiction of a first exemplary apparatus to carry out the present process.

FIG. 1 depicts exemplary apparatus 2 to carry out one embodiment of the present process. In FIG. 1, the part of the process pertaining to preparation of the miniemulsion has already been accomplished in a batch mode to provide a batch amount of the miniemulsion which is stored in vessels 4 and 22. Polymerization of the miniemulsion to form the polymeric particles is accomplished in a continuous mode to provide a continuous amount of the polymeric particles. Via conduit 6, the miniemulsion flows from the vessel 4 to the polymerization reactor 8 (depicted as a tubular-flow reactor). Miniemulsion flow begins from vessel 4 until it is empty, at which point the miniemulsion flow changes over to vessel 22; vessel 4 can then be refilled, and this cycle is repeated as often as desired to achieve continuous flow through the reactor. An oil bath 10 (e.g., SUN-21 heat transfer oil (Sunoco), Dow 200 silicone fluid, and glycol) surrounds the reactor to facilitate heating of the miniemulsion. The miniemulsion is heated while the miniemulsion flows within the reactor to form polymeric particles. Via another conduit 12, the emulsion containing the polymeric particles flows from the reactor through a cooling bath 14 to a receiving vessel 16. The cooling bath 14 may be composed of any suitable cooling medium (e.g., water, glycol, and isopropyl alcohol) which is maintained at a temperature ranging from about 1° C. to about 25° C. (the temperature should not be so low as to freeze the emulsion). Various valves 18 are present to control the flowrate. The receiving vessel rests on a Mettler balance 20 to help monitor reactor output. Pump 24 (which may be a Masterflex LS high pressure peristaltic pump) helps push the flow of material to the receiving vessel. "PG" refers to pressure gauge.

Figure 2:
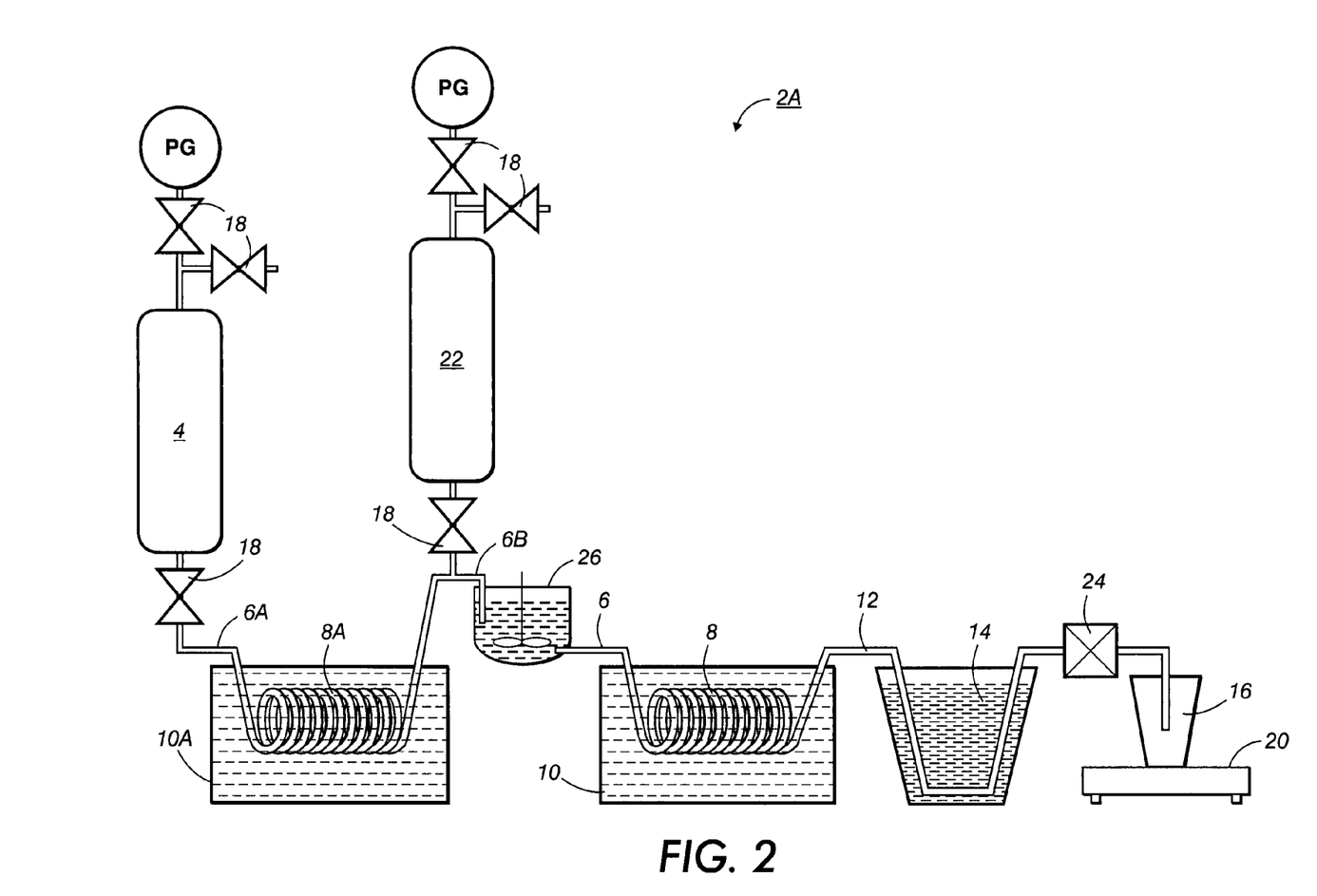
FIG. 2 represents a schematic depiction of a second exemplary apparatus to carry out the present process.

FIG. 2 depicts exemplary apparatus 2A to carry out another embodiment of the present process which is a fully continuous mode of operation to provide the polymeric 11 particles. In FIG. 2, vessel 4 contains the first mixture comprising a free radical polymerizable monomer, a free radical initiator, and a stable free radical compound. The first mixture flows from vessel 4 via conduit 6A to a polymerization reactor 8A (depicted as a tubular-flow reactor). The vessel 4 may be replenished as often as desired to maintain a continuous mode of operation. An oil bath 10A (e.g., SUN-21 heat transfer oil (Sunoco), Dow 200 silicone fluid, and glycol) surrounds the reactor 8A to facilitate heating of the first mixture. The first mixture is heated to the first polymerization temperature while flowing within the reactor to result in the prepolymer composition. A second mixture composed of prepolymer composition from the reactor 8A and other ingredients of the second mixture (e.g., continuous phase liquid and a stabilizing compound) from vessel 22 flows through conduit 6B to an in-line high shear mixer 26 where shearing of the second mixture is performed to result in the miniemulsion. For the apparatus 2A, polymerization of the miniemulsion to form the polymeric particles is then accomplished in a continuous mode to provide a continuous amount of the polymeric particles. In FIG. 2, via conduit 6, the miniemulsion flows from the mixer 26 to the polymerization reactor 8 (depicted as a tubular-flow reactor). An oil bath 10 (e.g., SUN-21 heat transfer oil (Sunoco), Dow 200 silicone fluid, and glycol) surrounds the reactor to facilitate heating of the miniemulsion. The miniemulsion is heated while the miniemulsion flows within the reactor to form polymeric particles. Via another conduit 12, the emulsion containing the polymeric particles flows from the reactor through a cooling bath 14 to a receiving vessel 16. The cooling bath 14 may be composed of any suitable cooling medium (e.g., water, glycol, and isopropyl alcohol) which is maintained at a temperature ranging from about 1° C. to about 25° C. (the temperature should not be so low as to freeze the emulsion). Various valves 18 are present to control the flowrate. The receiving vessel rests on a Mettler balance 20 to help monitor reactor output. Pump 24 (which may be a Masterflex LS high pressure peristaltic pump) helps push the flow of material to the receiving vessel. "PG" refers to pressure gauge. Reactor 8A may be the same or different from reactor 8.

In the apparatus 2A of FIG. 2, the first mixture is subjected to a pressure ranging for example from about 100 to about 1000 kPa, or from about 500 to about 700 kPa, while the first mixture flows within the reactor 8A.

In the apparatus 2A of FIG. 2, the first mixture flows within the reactor 8A at a volumetric flowrate of for example about 1 to about 10 ml/minute, or from about 2 to about 5 ml/minute. Volumetric flowrates outside these values are encompassed within the present invention since the volumetric flowrate may vary among different apparatus, and depends upon the geometry of the reactor (i.e., the tubing length and diameter in the case of a tubular-flow reactor). The volumetric flowrate is calculated based on following formula: volumetric flowrate=reactor volume/average residence time, where the reactor volume=tubing length×cross-sectional area.

In yet another embodiment, instead of using an in-line mixer 26 as in FIG. 2, the shearing of the second mixture (prepolymer composition, continuous phase liquid and stabilizing compound) is accomplished in a batch mode to provide a batch amount of the miniemulsion. To accomplish this embodiment, the first mixture may be polymerized in apparatus 2A as shown in FIG. 2. The prepolymer composition may then be stored in a separate vessel until it is needed. At a later time, the other reaction ingredients would be mixed with the prepolymer composition to form the second mixture, and this second mixture would be sheared to create the miniemulsion. This miniemulsion would then be reacted as described herein using the apparatus of FIG. 1.

In embodiments, there may be a single compound with the functional group in the polymeric particles or a mixture of two or more different compounds with the same or different functional group in the polymeric particles. In embodiments, there can be a single compound with two or more different functional groups, where such compounds are typically called zwitterions and contain for instance a carboxylic acid and an amine. For example, amino acids are zwitterions because upon ionization the hydrogen from the carboxylic acid goes on the nitrogen and the molecule now contains both a positive and negative charge.

In a first type, the compound with the functional group is of the formula I -R-SFR, wherein R is polymerized from the first monomer and second monomer, I is a covalently bound free radical initiator fragment with a covalently bound functional group arising from the second free radical initiator having the functional group, and SFR is a covalently bound stable free radical group. A compound with the functional group of the formula I-13 R-13 SFR can be for example:

I-(styrene/butylacrylate)$_x$-SFR where x is an integer ranging for example from 2 to about 1,000 for the compound in the prepolymer composition, and where x is an integer ranging for example from about 10 to about 30,000 for the compound in the polymeric particles.

In a second type, the compound with the functional group is of the formula I'-R'-SFR, wherein R' has a covalently bound functional group and R' is polymerized from the first monomer and from the second monomer which includes the functional group, I' is a covalently bound free radical initiator fragment arising from the first free radical initiator, and SFR is a covalently bound stable free radical group. A compound with the functional group of the formula I'-R'-SFR can be for example:

I'-(styrene/acrylicacid)$_x$-SFR where x is an integer ranging for example from 2 to about 1,000 for the compound in the prepolymer composition, and where x is an integer ranging for example from about 10 to about 30,000 for the compound in the polymeric particles.

In a third type, the compound includes two different functional groups and is of the formula I"-R"-SFR, wherein R" has a covalently bound first functional group and R" is polymerized from the first monomer and from the second monomer which includes the first functional group, I" is a covalently bound free radical initiator fragment with a covalently bound second functional group arising from the second free radical initiator having the second functional group, and SFR is a covalently bound stable free radical group. A compound with the functional group of the formula I"-R"-SFR can be for example:

I"-(styrene/styrenesulfonate/acrylicacid)$_x$-SFR where x is an integer ranging for example from 2 to about 1,000 for the compound in the prepolymer composition, and where x is an integer ranging for example from about 10 to about 30,000 for the compound in the polymeric particles.

In embodiments of the polymeric particles, the compound does not include a functional group and is of the formula I'-R-SFR, wherein R is polymerized from the first monomer and second monomer, I' is a covalently bound free radical initiator fragment arising from the free radical initiator, and SFR is a covalently bound stable free radical group. A compound without a functional group of the formula I'-R-SFR can be for example:

I-(styrene/butylacrylate)$_x$-SFR where x is an integer ranging for example from 2 to about 1,000 for the compound in the prepolymer composition, and where x is an integer ranging for example from about 10 to about 30,000 for the compound in the polymeric particles.

In embodiments, the present process can further include separating the polymeric particles (which may be solid) from the liquid phase, where such separation can be accomplished by conventional methods, such as, filtration, sedimentation, spray drying, and the like known methods.

The polymeric particles are composed of a compound whose characteristics are now discussed. The compound may have any number of repeating units such as for example from about 10 to about 30,000, or from about 50 to about 200. The weight average molecular weight (Mw) of the compound can be, for example, from about 1,000 to about 3,000,000, and particularly about 10,000 to about 150,000. The compound can have a narrow polydispersity, for example, of from about 1.1 to about 3.0, from about 1.1 to about 2.0, or from about 1.05 to about 1.45. The polymeric particles have a volume average diameter, for example, of from about 25 nanometers to about 1 micrometer, particularly from about 100 to about 600 nanometers.

With regards to monomers useful in the present invention which do not include a functional group, any suitable free radical polymerizable monomers may be employed in the present process including for example unsaturated monomers, such as styrene compounds, conjugated compounds, acrylates compounds, methacrylate compounds, 9-vinyl carbazole compounds, vinyl chloride compounds, and vinyl acetate compounds. More specifically the monomer can be styrene, alkyl substituted styrenes with from 1 to about 20 carbon atoms, butadiene, and alkyl methacrylate. The first monomer can be the same or different from the second monomer.

With regards to monomers useful in the present invention which include a functional group, they can be acrylic acid and its derivatives of the formula (CH$_2$=CH)COOR—COOH (where the R group can be a spacer aliphatic group to for example impart different hydrophilicity); maleic acid and its derivatives of the formula R,R'-maleicacid (where the R,R' group can be aliphatic or aromatic, as for example phthalic anhyride); styrenic monomers (such as styrenesulfonic acids, 4-vinylbenzoic acids); and methacrylic acid and its derivatives of the formula (CH$_2$=CCH$_3$)COOR-COOH (where the R group can be a spacer aliphatic group to for example impart different hydrophilicity), and the like.

With regards to initiators useful in the present invention which do not include a functional group (where such initiators in embodiments may be soluble in the continuous phase liquid), any suitable free radical initiator may be employed such as peroxide compounds and diazo compounds like for example benzoyl peroxide, di-tbutylperoxide, 4,4'-azobisvaleronitrile, and 4,4'-azobis(cyanohexane). The first initiator can be the same or different from the second initiator.

In embodiments, the first initiator, the first monomer, or both the first initiator and the first monomer includes a functional group which may be the same or different from each other, and may be the same or different from the functional group of the second initiator or the functional group of the second monomer.

With regards to initiators useful in the present invention which include a functional group (where such initiators in embodiments may be soluble in the continuous phase liquid), any suitable free radical initiator may be employed such as hydrogen peroxide, t-butyl hydroperoxide, 2,2'-azobis(2-amidinopropane)dihydrochloride, 2,2'-azobis(2-methylpropionamidine)dihydrochloride, 4,4'azobis(4-cyanovaleric acid), 4,4'-azobis(4-cyanopentanoic acid), potassium persulfates and aminopersulfates.

The covalently bound stable free radical end group SFR can be obtained from a stable free radical compound such as 2,2,5,5-tetramethyl-1-pyrrolidinyloxy compounds, 2,2,6,6-tetramethyl-1-piperidinyloxy compounds, 4,4-dimethyl-3-oxazolinyloxy compounds, and di-tertiary alkyl substituted nitroxide compounds. SFR end groups and stable free radical compounds are disclosed in for example U.S. Pat. No. 5,530,079, the disclosure of which is totally incorporated herein by reference. The first stable free radical compound can be the same or different from the second stable free radical compound.

The phrase "stable free radical compound" encompasses: (1) the stable free radical compound by itself; and (2) an adduct of the stable free radical compound composed of for example stable free radical compound-monomer unit-initiator fragment, where the stable free radical compound is covalently bound to the monomer unit and the initiator fragment is covalently bound to the monomer unit, or where the adduct is the stable free radical compound covalently bound to the monomer unit. One example of an adduct is benzoicacid-2-phenyl-2-(2,2,6,6-tetramethylpiperidin-1-yloxy)-ethylester, formed from benzoyl peroxide, styrene and 2,2,6,6-tetramethyl-1-piperidinyloxy free radical (also referred herein as "TEMPO").

The stabilizing compound can be for example a surfactant including anionic, cationic, amphoteric, and nonionic surfactants customarily used in emulsion polymerization. In embodiments, the surfactant is selected from ionic surfactants, which class of surfactants may be generally better suited to the higher temperatures associated with the present processes. Representative types of anionic surfactants are the alkylaryl sulfonates, alkali metal alkyl sulfates, the sulfonated alkyl esters, the fatty acid soaps, and the like, such as sodium alpha-olefin (C$_{14}$-C$_{16}$) sulfonates. Exemplary surfactants are alkali metal alkylaryl sulfonates. In embodiments, there are used anionic surfactants, such as alkyl sulfonate salts or arylalkyl sulfonate salts, for example, dodecylbenzenesulfonic acid sodium salt ("SDBS"). The surfactant can be employed in varying amounts providing that a satisfactory miniemulsion is achieved by, for example, exceeding the critical micelle concentration (CMC). The stabilizing compound can be present for example in an amount of from about 1 to about 5 weight percent, or from about 2 to about 5 weight percent, and especially from about 2 to about 3 weight percent, based on the weight of the continuous phase liquid. A listing of suitable stabilizing compounds such as surfactants which may be useful in the inventive process is found in the book "McCutcheon's Emulsifiers and Detergents 1981 Annuals", which is incorporated by reference herein in its entirety.

One or more cosurfactants can be optionally added to further minimize diffusion due to Oswald ripening. In embodiments, however, no cosurfactant is employed in the present process. The cosurfactant may be compounds that have a low water solubility, or are substantially insoluble, such as long chain hydrocarbons with from about 10 to about 40 carbon atoms, and particularly from about 15 to about 25 carbon atoms, alcohols, mercaptans, carboxylic acids, ketones, amines, or any other long chain molecules, with or without functional groups that do not substantially interfere with the stable free radical or miniemulsion chemistry, for example, dodecyl mercaptan, hexadecane, cetyl alcohol, and the like, and mixtures thereof, wherein the cosurfactant is in a mole ratio of, for example, from about 0.004 to about 0.08, and preferably from about 0.005 to about 0.05 with respect to the monomer, a mole ratio of from about 0.1 to about a 10, and particularly from about 0.5 to about 5.0 with respect to the surfactant. In embodiments, the cosurfactant can be a linear or branched hydrocarbon with from about 5 to about 40 carbon atoms, a linear or branched aliphatic alcohol with from about 5 to about 40 carbon atoms, wherein the cosurfactant is in a mole ratio of from about 0.01 to about 0.04 with respect to the monomer, a mole ratio of from about 0.5 to about 6.0 with respect to the surfactant, and wherein the cosurfactant prevents, or minimizes coalescence of the miniemulsion droplets. In embodiments, the cosurfactant is in a mole ratio of from about 0.012 to about 0.025 with respect to the monomer.

The concentration of the cosurfactant mentioned above and the concentration of the activator mentioned below are relative to the "monomer." In embodiments, the "monomer" refers to the amount of the monomer or monomers present in the first mixture.

Alternatively in embodiments in place of a cosurfactant, high polymer, one or more activator compounds, can be added in minor amounts to enhance droplet nucleation as well as minimize Oswald ripening. Activators are typically used in amounts of from about 0.01 to about 2 weight percent based on monomer. The molecular weight of the activator, in embodiments, can range from about 1,000 to about 200,000, and particularly from about 3,000 to about 15,000.

The miniemulsion can further include a buffer such as alkali metal carbonates, alkaline earth carbonates, alkali metal bicarbonates, acetates, borates, and the like buffers, and mixtures thereof. In embodiments, the buffer may be added before the formation of the miniemulsion.

The polymeric particles of the present invention may be optionally crosslinked with, for example, known crosslinking or curing agents such as divinyl benzene and the like, either in situ or in a separate post polymerization process procedure.

Additional optional known additives may be used in the polymerization reactions which do not interfere with the present process and which may provide additional performance enhancements to the resulting product, for example, colorants, lubricants, release or transfer agents, antifoams, antioxidants, and the like.

In embodiments, there can be incorporated into the first mixture, the second mixture, or the miniemulsion, or at any stage of the present process, a waxy component, such as alkylenes, like polyethylene, polypropylene waxes, and mixtures thereof having a low molecular weight of from between about 1,000 to about 20,000 in amounts of from about 0.1 to about 15 weight percent of the total monomer polymerized. Alternatively, the waxy component may be added to the isolated polymeric particles. The use of such a component may be desirable for certain toner applications. Suitable low molecular weight waxes are disclosed in U.S. Pat. No. 4,659,641, the disclosure of which is totally incorporated herein by reference.

Toner compositions can be prepared by a number of known methods, such as admixing and heating resin, or polymeric particles obtained with the processes of the present invention such as water soluble or insoluble styrene butadiene copolymers, colorants, such as pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter. Alternatively, the toner compositions are ground with a fluid bed grinder equipped with a classifier wheel constructed in accordance with the present invention, and then classified using a classifier equipped with a classifier wheel constructed in accordance with the present invention. In embodiments, a toner can be prepared directly, thereby foregoing the extensive particle sizing and separation process by including, for example, a suitable colorant in the miniemulsion droplets prior to polymerization, and thereafter isolating the resulting colored toner particles. In embodiments, the presence of functional groups on the surface of the polymeric particles is advantageous for chemical toner fabrication. The surface charges allow for aggregants to react with them and thus result in latex aggregation from nanometer sized particles to micrometer sized chemical toner.

Illustrative examples of resins suitable for toner and developer compositions include branched styrene acrylates, styrene methacrylates, styrene butadienes, vinyl resins, including branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge-enhancing additive is present, and 10 percent by weight of pigment or colorant, such as carbon black, is contained therein, about 89 percent by weight of resin is selected. Also, the charge-enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable colorants, such as pigments or dyes can be selected as the colorant for the toner particles including, for example, carbon black like REGAL 330®), nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO.Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 10 percent by weight, and preferably in an amount of from about 0.1 percent by weight to about 5 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be themselves surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyan materials that may be used as pigments include copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methyl methacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner compositions may have toner particles with an average diameter of for example from about 5 to about 25 microns, from about 8 to about 12 microns, or from about 5 to about 8 microns. Also, the toner compositions may possess a triboelectric charge of for example from about 0.1 to about 2 femtocoulombs per micron as determined by the known charge spectrograph. Admix time for toners are for example from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared, in embodiments, of the present invention possess desirable narrow charge distributions, optimal charging triboelectric values, such as for example of from 10 to about 40, or from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of for example less than 15 seconds, or in some embodiments from about 1 to about 14 seconds.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated. The phrase "room temperature" refers to a temperature ranging from about 20 to about 25 degrees C.

EXAMPLE 1

A. Preparation of Prepolymer Composition (2-L Scale)

About 1474 g styrene (Rohm and Haas) was charged into a 2-L stainless steel Buchi reactor. Mixing was started at a rate of 450 RPM using a 2 inch diameter stainless steel pitch-blade impeller, and this was maintained throughout the reaction. About 10.2 g TEMPO (Z.D. Chemipan) was added to the mixture and stirred for 5 minutes to dissolve. About 16.2 g Lucidol 75 benzoyl peroxide (Aldrich) was added to the mixture and stirred for 5 minutes to dissolve. Nitrogen was bubbled through the mixture at a rate of 5 standard cubic feet per hour ("SCFH") throughout the reaction. The reactor was heated up to 135° C., and this temperature was maintained for 60 minutes. The reactor was then cooled to room temperature and reactor contents were discharged into a stainless steel beaker. The solution contained 12.2 wt % polymer solids as measured gravimetrically. The polymer solids had the following molecular weight characteristics as measured by gel permeation chromatography: Mn=3186, Mw=3637, Polydispersity=1.14. This product was hereafter refered to as "Prepolymer Composition."

B. Creating Miniemulsion

About 3076 g deionized water was charged into a 4-L stainless steel beaker, and mixing was started at a rate of 500 RPM using a 2-inch diameter stainless steel pitch-blade impeller. About 61 g dodecylbenzenesulfonic acid sodium salt ("SDBS"; Aldrich) and 5.1 g ascorbic acid (Aldrich) were added to the water and mixed for 5 minutes to dissolve. About 696 g of the Prepolymer Composition was added to the mixture and stirred for 5 minutes. The mixture was then passed through a Niro-Soavi piston homogenizer that was set at a pressure between 400 BAR to 600 BAR to result in the miniemulsion.

C. Continuous Formation of Polymeric Particles (Using Apparatus 2 of FIG. 1)

About 800 g of the miniemulsion was charged into vessel 4 by vacuum, and 800 g of the miniemulsion was similarly charged into vessel 22. Both vessels were pressurized to 700 kPa with nitrogen. The oil bath 10 was heated to 135° C. The polymerization reactor was filled with 553 ml of the miniemulsion by opening the appropriate valve from vessel 4. The feed rate was then adjusted in the polymerization reactor to achieve a flowrate of 4.61 ml per minute. This flowrate corresponded approximately to a two hour average residence time within this particular reactor, meaning that it takes an average of two hours for a miniemulsion droplet to move from the reactor inlet to outlet (that is 553 ml÷4.61 ml/minute=120 minutes). The reactor was a stainless steel tubular-flow reactor having a total tube volume of about 553 ml, a tube length of about 500 feet, and an outside diameter of about ⅛ inch. For ease of calculation, the total tube volume and the tube length included both the reactor tubing and the unheated portion of the tubing outside the reactor (the contribution to the total tube volume and the tube length made by the unheated portion of the tubing outside the reactor was relatively small). Steady state conditions were considered to be achieved after 2 hours of operation, at which point product collection was started. The reaction was continued for a further 2 hours after this point. Also during this time, flow was switched over to vessel 22 when vessel 4 became empty. The final latex contained 19.1% solids as measured gravimetrically. Volume average particle size was 116 nm as measured by a NICOMP model 370 light scattering device. About 4875 ppm residual styrene was measured by gas chromatography. The polymeric particles were composed of a compound that exhibited the following molecular weight characteristics as measured by gel permeation chromatography: MN=36244, MW=45313, and polydispersity index=1.25.

We claim:
1. A process comprising:
heating to a first polymerization temperature a first mixture comprising a free radical polymerizable monomer, a free radical initiator, and a stable free radical compound to polymerize only a portion of the monomer, resulting in a prepolymer composition;
shearing a second mixture including the prepolymer composition, a continuous phase liquid, and a stabilizing compound to create a miniemulsion; and
flowing the miniemulsion within a continuous mode polymerization reactor and heating the miniemulsion at a second polymerization temperature to form polymeric particles wherein the formation of the polymeric particles occurs while the miniemulsion flows within the continuous mode polymerization reactor.

2. The process of claim 1, wherein the miniemulsion is subjected to a pressure ranging from about 100 to about 600 kPa while the miniemulsion flows within the reactor.

3. The process of claim 1, wherein the first polymerization temperature ranges from about 100 to about 145 degrees C.

4. The process of claim 1, wherein the second polymerization temperature ranges from about 100 to about 145 degrees C.

5. The process of claim 1, wherein the reactor is a tubular-flow reactor.

6. The process of claim 1, wherein the miniemulsion flows within the reactor at a volumetric flowrate of about 0.1 to about 10 nd/minute.

7. The process of claim 1, wherein the heating of the first mixture and the shearing of the second mixture are accomplished in a batch mode to provide a batch amount of the miniemulsion.

8. The process of claim 1, wherein the heating of the first mixture and the shearing of the second mixture are accomplished in a continuous mode to provide a continuous amount of the miniemulsion.

9. The process of claim 1, wherein the heating the first mixture is ended when about 1 to about 50% of the monomer is polymerized.

10. The process of claim 1, wherein the polymeric particles includes a compound exhibiting a molecular weight polydispersity of from about 1.1 to about 3.0.

11. The process of claim 1, wherein the continuous phase liquid is water.

12. The process of claim 1, wherein the polymeric particles have a volume average diameter of from about 25 nanometers to about 1 micrometer.

13. The process of claim 1, wherein the first mixture further includes a co-monomer.

14. A process comprising:

heating to a first polymerization temperature a first mixture comprising a first free radical polymerizable monomer, a first free radical initiator, and a first stable free radical compound to polymerize only a portion of the first monomer, resulting in a prepolymer composition;

shearing a second mixture including the prepolymer composition, a continuous phase liquid, and a stabilizing compound to create a miniemulsion; and flowing the miniemulsion within a continuous mode polymerization reactor and heating the miniemulsion at a second polymerization temperature to form polymeric particles wherein the formation of the polymeric particles occurs while the miniemulsion flows within the continuous mode polymerization reactor, wherein there is added to the second mixture, the miniemulsion, or both the second mixture and the miniemulsion at any time prior to the formation of the polymeric particles a second free radical initiator, a second free radical polymerizable monomer, and an optional second stable free radical compound, wherein at least one of the second initiator and the second monomer includes a functional group, wherein the polymeric particles each includes a compound with the functional group covalently bound and with the functional group disposed on the particle surface.

15. The process of claim 14, wherein the first stable free radical compound and the second stable free radical compound are the same.

16. The process of claim 14, wherein the second initiator includes the functional group.

17. The process of claim 14, wherein the second monomer includes the functional group.

18. The process of claim 14, wherein the second initiator includes the functional group and the second monomer includes the same or different functional group.

19. The process of claim 14, wherein the first mixture further includes a co-monomer.

* * * * *